May 16, 1961 H. L. DOBRIKIN 2,984,445
MOVABLE HOSE SUPPORT

Filed June 29, 1959 2 Sheets-Sheet 1

INVENTOR.
Harold L. Dobrikin,
BY Parker & Carter
Attorneys.

May 16, 1961  H. L. DOBRIKIN  2,984,445
MOVABLE HOSE SUPPORT
Filed June 29, 1959  2 Sheets-Sheet 2

INVENTOR.
Harold L. Dobrikin,
BY Parker & Carter
Attorneys.

United States Patent Office 2,984,445
Patented May 16, 1961

2,984,445

MOVABLE HOSE SUPPORT

Harold L. Dobrikin, Chicago, Ill., assignor to Berg Airlectro Products Company, Chicago, Ill., a corporation of Illinois Filed June 29, 1959, Ser. No. 823,669

3 Claims. (Cl. 248—204)

This invention relates to supports and particularly to supports for flexible hoses.

One purpose of the invention is to provide a support for flexible hoses extending between truck tractors and trailers.

Another purpose is to provide a support which shall be freely movable in all directions but which shall automatically return to a predetermined position when free of forces exerted thereagainst.

Another purpose is to provide a hose support of maximum simplicity and economy in manufacture.

Another purpose is to provide a hose support which shall operate in a minimum amount of space.

Another purpose is to provide a hose support which may be easily installed and removed with a minimum of tools.

Another purpose is to provide a support for flexible hoses extending between a truck tractor and trailer which support shall be effective to support said hoses at all times during movement of said tractor and trailer and at all relative positions therebetween.

Other purposes will appear from time to time during the course of the specification and claims.

I illustrate my invention more or less diagrammatically in the accompanying drawings wherein.

Like parts are indicated by like numerals throughout the specifications and drawings.

Figure 1:
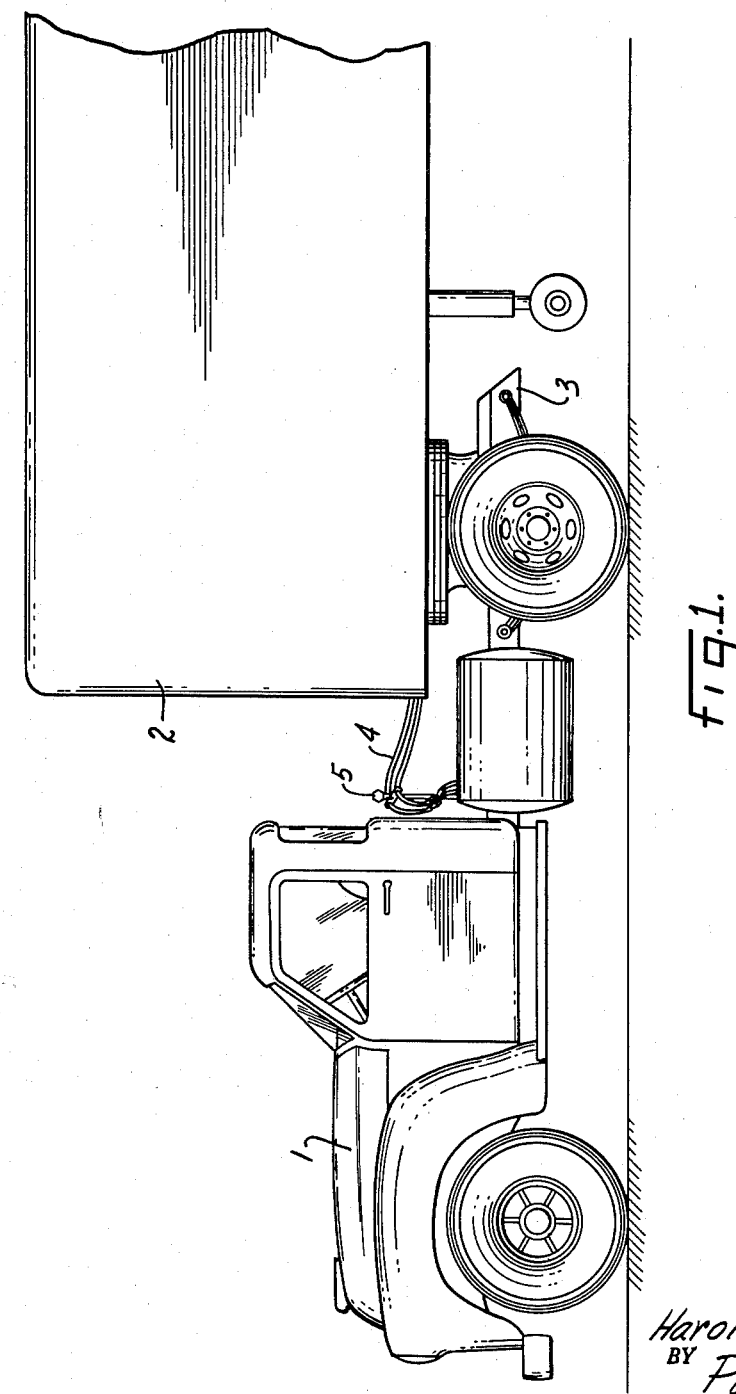
Figure 1 is a side elevation illustrating the support of my invention in hose-supporting position on a tractor.

Referring now to the drawings and particularly to Figure 1, the numeral 1 generally indicates a truck tractor. A trailer is indicated generally at 2. The tractor has a standard rear bed 3 and a plurality of flexible hoses indicated collectively at 4 extending from the tractor to the trailer and being of a length substantially greater than the distance between the tractor and trailer. The hose support of my invention is indicated generally in Figure 1 by the numeral 5. It will be observed that the hose support is secured to the tractor bed 3 and rises upwardly therefrom to a height substantially equal to half that of the cab of tractor 1 and that the support 5 is positioned between the cab and the trailer 2.

Figures 2, 3:
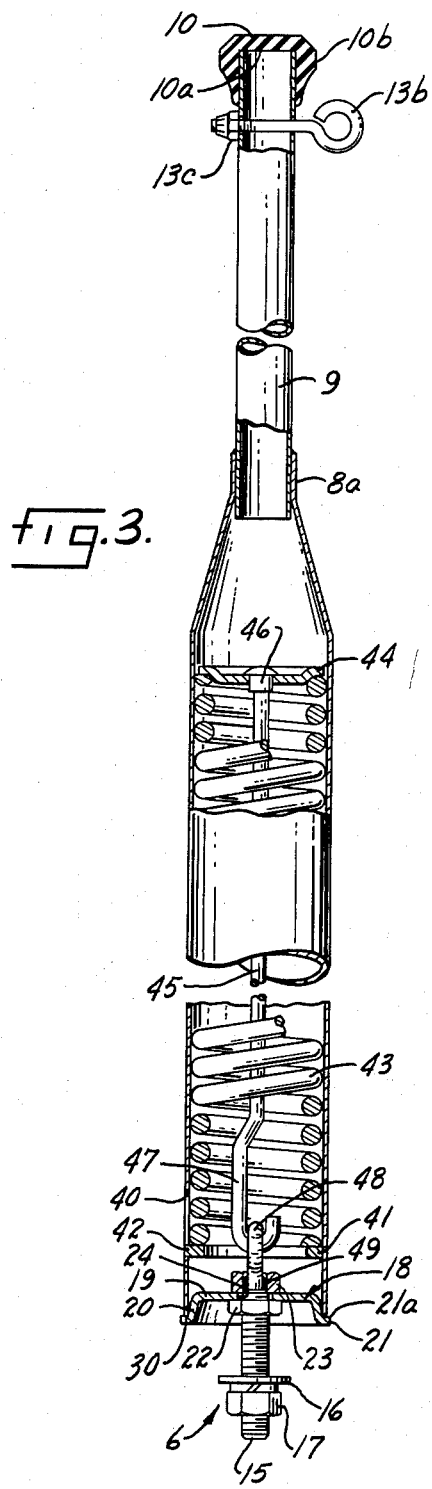
Figure 2 is a side elevation, on an enlarged scale, of the support of my invention.
Figure 3 is a view in partial cross-section, and on a further enlarged scale, of the support of my invention.

Referring now to Figure 2, the device of my invention comprises a connector means indicated generally at 6, a rock plate 7 secured to bed 3 by means 6, an elongated member 8, tiltably positioned on plate 7 and having a rod-like upwardly-extending portion 9 and an upper bumper element 10, along with hose-securing clamp members 11 and 12 selectively positioned along the portion 9 and a swingably mounted hose-clamping element 13 positioned adjacent the bumper 10 at the upper end of portion 9.

Referring now to Figure 3, the securing means 6 may comprise a bolt or other longitudinal member 15, a plate or washer member indicated generally at 16 positioned adjacent the outer end of member 15 for engagement against the undersurface of truck bed 3, for example, and a nut or other securing element 17 adapted for engagement with the outer end of member 15.

Member 15 has secured thereto, adjacent its upper or opposite end from that engaging member 17, a base or fulcrum or rock plate 7 which may take the form of an inverted cup-like configuration having a central horizontal circular end wall 19 bounded by a downwardly and slightly outwardly inclined or conical wall portion 20 which in turn terminates in an annular outwardly extending flange 21. Securing members 22, 23 are connected to member 15 which extends through an aperture 24 in wall 19 to secure member 20 to member 15.

Member 8 comprises a hollow cylindrical or tubular base element having a lower open end 18. The inner diameter of tube end 18 is substantially equal to the maximum outer diameter of wall surface 20 and the lower cylindrical edge 30 of member 8 rests upon the upper surface 21a of flange 21. The extension 9 may comprise a hollow tubular element spot welded or otherwise secured to the upper end 8a of member 8, the portion 8a being generally frusto-conical in form.

Bumper element 10 comprises a rubber, cup-like member having an inner well 10a formed and adapted to receive the upper cylindrical end of member 9 and to be secured thereto by any suitable means such as an appropriate adhesive. The member 10 has an enlarged intermediate cylindrical portion 10b which, when member 10 is installed, surrounds the upper end portion of member 9.

The circumferential wall of member 8, adjacent the lower portion thereof, is vertically slotted at a plurality of circumferentially spaced points thereon, one of said slots being illustrated at 40. A spring-supporting disc 41 has a number of radially extending finger portions, such as that illustrated at 42, formed and adapted to extend through the slots 40 when the member 41 is positioned within the hollow base 18 of member 8.

A spring 43 has an outer diameter substantially equal to the inner diameter of base portion 18 of member 8 and has its lower end seated upon the upper surface of member 41. Spring 43 extends in normal position, throughout substantially the length the cylindrical base portion 18 of member 8 and engages at its upper end a spring retainer 44. A carriage hook member 45 has its upper end secured, as at 46, to retainer 44 and extends downwardly through spring 43, terminating at its lower end in hook portion 47. Hook 47 movably or freely engages an eye member 48 which is secured, as at 49, to member 23 and thus to fulcrum plate 7.

Hose clamp member 13 may be secured to the upper portion of extension 9 as by the yoke 13a extending loosely through eye 13b which in turn has a portion extending through member 9 and secured thereto as by connector means 13c. It will be realized that, whereas hose bracket or clamp 13 is shown as having three openings therein for passage therethrough of three flexible hoses the bracket 13 may take a variety of forms and may be employed to secure a varying number of hoses without departing from the nature and scope of my invention.

While I have shown and described a preferred form and suggested several variations of my inventions, as well as illustrating a species, numerous additional modifications, changes, substitutions and alterations may be made without departing from the invention's fundamental theme. With these and various other modifications in mind, I wish that the invention be unrestricted, except as by the appended claims.

The use and operation of my invention are as follows:

The hose support of my invention in assembled state may be easily and simply installed on the bed of a truck tractor, the member 15 being simply extended through an aperture in bed 3, for example, and the connector elements 16, 17 being brought up against the lower surface thereof. Thus the fulcrum plate 7 is rigidly supported on truck bed 3. The hoses to be supported are then secured to the support, brackets 11, 12 being employed where desired to retain the hoses adjacent a lower portion of the support, the hoses being passed also through apertures in member 13 which is supported, in free-swinging relationship, adjacent the upper end of my support.

In response to relative movement between the tractor 1 and trailer 2 the hoses 4 are caused to move in different directions. When this happens, the support member 8 is free to and is caused to tilt universally on fulcrum plate 7. When this occurs the spring 43 is distorted or compressed by retainer 44 which is held against upward movement by rod 45, the hook 47 being universally tiltable in eye member 48. When the relative movement between trailer 2 and tractor 1, which produced the movement of hoses 4 and consequent tilting of support member 8, ceases the spring 43 is effective to return the support member 8 to vertical position on fulcrum plate 7. It will be observed that retainer 44 has an outer diameter only slightly less than the inner diameter of support member 8. It will further be observed that spring 43, retainer 44, hook 47 and member 48 are effective to hold the support member 8 securely upon fulcrum plate 7 at all times and to permit tilting thereof while storing energy effective to provide automatic return to vertical position on plate 7 upon cessation of deflecting forces exerted against support member 8.

I claim:

1. In a support, a fulcrum plate, an elongated hollow tubular member having a bottom end edge tiltably seated on said fulcrum plate, a coil spring extending within said hollow member for substantially the entire length of said hollow member, a retainer plate slidably mounted adjacent the opposite end edge of said hollow member and having a diameter only slightly less than that of said hollow member, elongated rigid means fixedly secured at one of its ends to said retainer plate and extending through said hollow member, said rigid means being tiltably secured at its opposite end to said fulcrum plate, said coil spring having its circumferential surface in contact with the inner wall of said tubular member throughout the length of said spring, an annular ring engaging said inner wall of said tubular member adjacent said bottom edge, said coil spring having its opposite ends operative against the lower surface of said retainer and the upper surface of said ring to urge said retainer plate away from said fulcrum plate and to urge said hollow member toward said fulcrum plate.

2. In a support, a fulcrum plate, an elongated hollow tubular member having a bottom edge tiltably seated on said fulcrum plate, a coil spring extending within said hollow member for substantially the entire length of said hollow member, a retainer plate slidably mounted within and adjacent the opposite end edge of said hollow member, said retainer plate having a diameter only slightly less than that of said hollow member, an elongated rigid rod fixedly secured at one of its ends to said retainer plate and extending axially through said coil spring, said rod having its opposite end tiltably secured to said fulcrum plate, said coil spring having its circumferential surface in contact with the inner wall of said tubular member throughout the length of said spring, said coil spring having its opposite ends in operative engagement with the undersurface of said retainer and with a lower portion of said hollow member to urge said retainer away from said fulcrum plate and to urge said hollow member towards said fulcrum plate.

3. A support comprising a base plate, an elongated member comprising an upper tubular portion and a lower, elongate tubular portion, said lower portion having its bottom edge tiltably supported on said base, an annular ring slidably mounted in said lower tubular portion adjacent said bottom edge, said annular ring having its periphery in contact with the inner wall of said lower tubular member, a slot in the wall of said lower tubular member adjacent the bottom edge thereof, said ring having a projection slidable in said slot, a coil spring seated on the upper surface of said ring and having its circumferential surface in contact with the inner wall of said lower tubular member throughout the entire length of said spring and throughout substantially the entire length of said lower tubular member, a retainer plate slidable in said lower tubular member adjacent the upper portion thereof, said retainer plate having its lower surface in contact with the opposite end of said coil spring, a rod fixedly secured to said retainer plate and extending coaxially through said coil spring, said rod having its lower end tiltably secured to said base plate.

References Cited in the file of this patent

UNITED STATES PATENTS

| | | |
|---|---|---|
| 1,250,064 | Whims | Dec. 11, 1917 |
| 1,313,616 | Walsh | Aug. 19, 1919 |
| 1,341,318 | Hannagan | May 25, 1920 |
| 2,098,388 | Hruska | Nov. 9, 1937 |
| 2,733,033 | Gunderson | Jan. 31, 1956 |